H. D. JANES.
ROAD-SCRAPER AND GRADER.

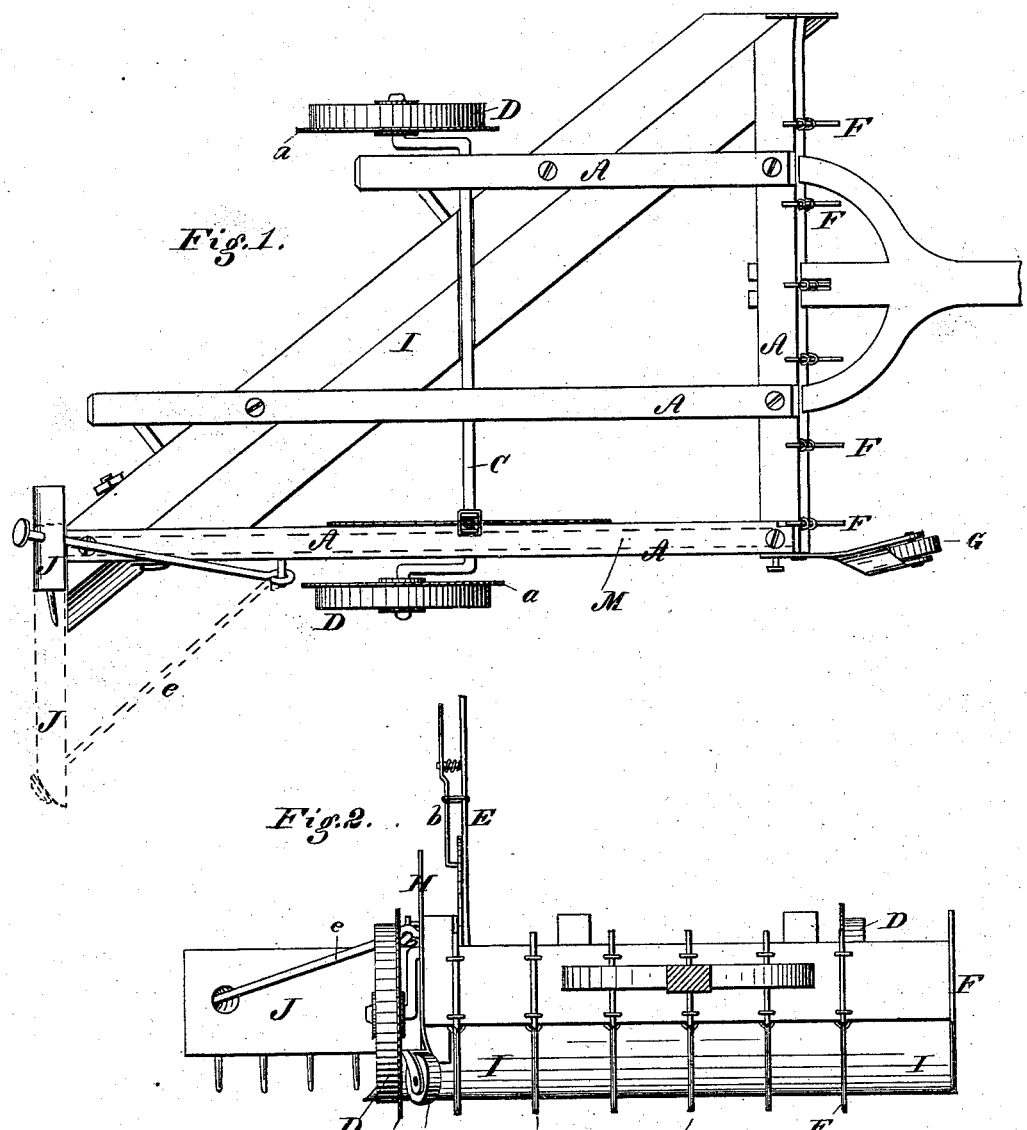

No. 187,467. Patented Feb. 20, 1877.

Witnesses:

Inventor:
H. D. Janes
By his Attys.
Dodge & Son

UNITED STATES PATENT OFFICE.

HENRY D. JANES, OF DODGE CENTRE, MINNESOTA.

IMPROVEMENT IN ROAD SCRAPERS AND GRADERS.

Specification forming part of Letters Patent No. 187,467, dated February 20, 1877; application filed August 3, 1876.

*To all whom it may concern:*

Be it known that I, HENRY D. JANES, of Dodge Centre, in the county of Dodge and State of Minnesota, have invented certain Improvements in Road-Scraper and Grading-Machine, of which the following is a specification:

My invention relates to a novel manner of constructing a machine for grading and leveling roads; consisting of an adjustable wheeled frame, provided with a series of colters or knives at the front, to slice and break up the earth; an inclined scraper, to deliver the loose earth sidewise upon the road-bed; a rake, to smooth and level the earth down on the road; flanged cutting-wheels, to enter the ground, and prevent the machine from shifting sidewise; and a removable side board, by the use of which the machine may be adapted for carrying earth forward, like an ordinary road-scraper, all as hereinafter more fully explained.

Figure 3:
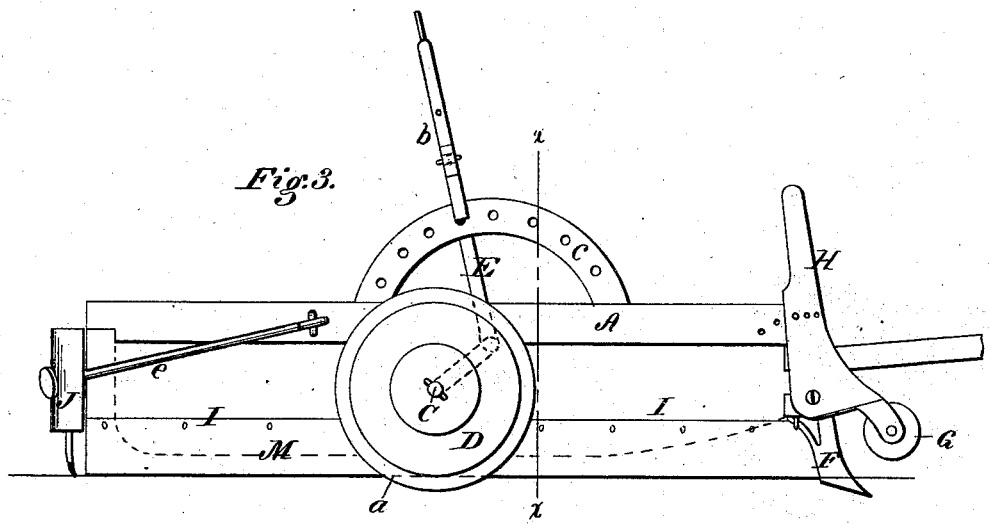
Figure 4:
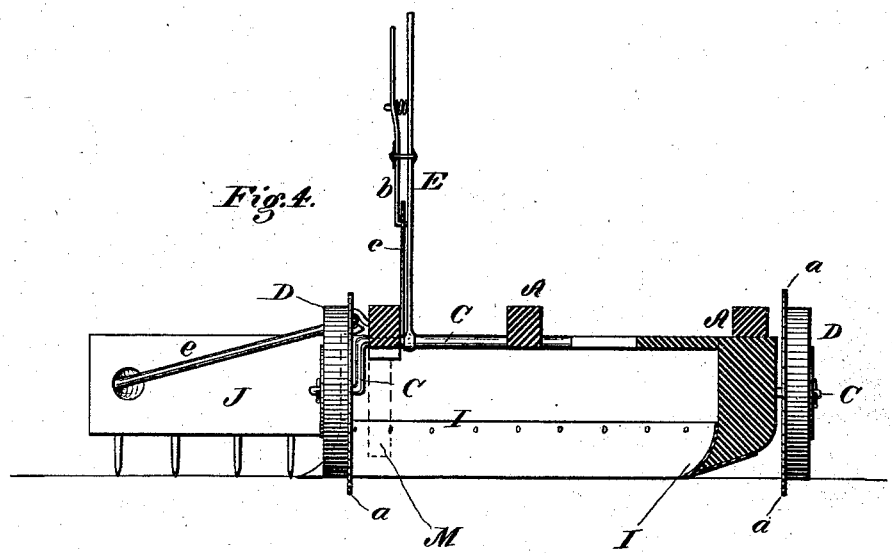

Figure 1 represents a top-plan view of my machine; Fig. 2, a front elevation of the same; Fig. 3, a side elevation of the same; Fig. 4, a transverse vertical section through the middle of the machine, looking backward.

A represents the rigid frame of the machine, consisting of a front cross-beam and a series of rearwardly-extending beams, mounted on a transverse axle, C, the ends of which are cranked, and mounted in two supporting-wheels, D, having sharp flanges $a$, which enter the ground, and serve to prevent the machine from being pushed sidewise by the action of the oblique scraper.

The crank-axle C is provided with a hand-lever, E, by means of which it may be turned so as to throw the wheels up or down, and thereby raise or lower the frame, the lever being provided with a spring-catch, $b$, which engages in a rack-bar, $c$, on the frame, so as to hold the lever and wheels in position.

F F represent a series of vertical colters or knives, secured at short distances apart to the front of the main frame, for the purpose of slicing and breaking up the earth in such manner that it may be readily moved by the scraper. G represents a small wheel mounted on the end of an adjustable elbow-lever, H, at the front corner of the frame, to assist in sustaining the same, and prevent the colters or knives from entering too deeply into the ground. I represents a long scraper extending from one end of the front beam backward obliquely across the machine for the purpose of delivering the loose earth at one side of the machine.

As shown in the drawing, the scraper is secured rigidly to the frame, and has its lower edge curved forward, and plated with metal, so that it will readily ride under and take up the earth, stone, &c.

J represents a heavy hinged rake, extending outward, from the rear end of the scraper, beyond and at right angles to the main frame, for the purpose of raking down, leveling, and distributing the earth delivered by the scraper upon the road-bed. The rake is held and braced by a rod, $e$, as shown, and is so arranged that when not required for use it can be turned up on end, out of action, and out of the way.

In operating the machine, it is drawn forward by the side of the road-bed, with the rake extending across the same. The colters or knives cut and break up the earth, and the scraper, following after, gathers the earth thus loosened, and delivers the same sidewise upon the road in advance of the rake, which levels and distributes the earth down smoothly and evenly in place, thereby producing a finished road-bed.

In order that the machine may be used, when desired, to carry earth forward like a common road-scraper, instead of delivering it sidewise, I provide a long side board, M, which may be secured lengthwise under the side of the frame in such manner that its rear end will join the rear end of the oblique scraper, as shown in dotted lines in Figs. 1, 2, and 3. When the side board is thus applied, the earth will be retained between it and the scraper, and carried forward with the machine.

The side board may be attached in any suitable manner which will permit its ready removal; but the most simple arrangement is to insert its forward end into a mortise in the front of the frame, and secure its rear end by a bolt passing through the rear end of the oblique scraper.

In carrying the machine to and from the field of operations the wheels are depressed, so as to raise the scraper and colters from the ground, and the rake turned up on end, when the machine may be hauled about on its wheels like a wagon.

Having thus described my invention, what I claim is—

1. The grading and leveling machine, consisting of the adjustable wheeled frame A, provided with the colters F, the oblique scraper I, and the rake J, constructed and arranged to operate substantially as shown and described.

2. In combination with the frame A, having the oblique scraper I attached, the supporting-wheels D, provided with the flanges a, to enter the ground and prevent the machine from moving laterally.

3. In combination with the frame A, provided with the oblique scraper I, the removable side board M, substantially as and for the purpose described.

HENRY D. JANES.

Witnesses:
C. H. BENTON,
C. H. BROWN.